US012803398B2

(12) United States Patent
Arnault et al.

(10) Patent No.: US 12,803,398 B2
(45) Date of Patent: Nov. 17, 2026

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 139 days.

(21) Appl. No.: 18/589,984

(22) Filed: Feb. 28, 2024

(65) Prior Publication Data

US 2024/0305175 A1 Sep. 12, 2024

(30) Foreign Application Priority Data

Mar. 8, 2023 (FR) ....................................... 2302143

(51) Int. Cl.
*H02K 11/40* (2016.01)
*H01R 39/38* (2006.01)

(52) U.S. Cl.
CPC ........... *H02K 11/40* (2016.01); *H01R 39/385* (2013.01)

(58) Field of Classification Search
CPC .... F16C 2380/26; F16C 41/002; H01R 39/24; H01R 39/385; H02K 11/40; H02K 5/1732; H02K 7/003
See application file for complete search history.

(56) References Cited

U.S. PATENT DOCUMENTS

| | | | |
|---|---|---|---|
| 11,454,285 B2 | 9/2022 | Arnault et al. | |
| 11,486,445 B2 | 11/2022 | Berruet et al. | |
| 2020/0295634 A1 | 9/2020 | Lenz et al. | |
| 2021/0021180 A1* | 1/2021 | Hubert | F16C 41/002 |
| 2021/0234436 A1* | 7/2021 | Leisinger | H02K 9/197 |
| 2021/0310517 A1 | 10/2021 | Berruet et al. | |
| 2021/0364041 A1 | 11/2021 | Berruet et al. | |
| 2022/0294319 A1 | 9/2022 | Arnault et al. | |

FOREIGN PATENT DOCUMENTS

JP 2015095440 A 5/2015

OTHER PUBLICATIONS

Preliminary Search Report from the French Patent Office dated Oct. 13, 2023 in related French application No. FR 2302143, including Search Report and Written Opinion.
Unpublished U.S. Appl. No. 18/589,874, first named inventor: Benoit Arnault, filed Feb. 28, 2024.

* cited by examiner

*Primary Examiner* — Christopher M Koehler
*Assistant Examiner* — Ethan Nguyen Vo
(74) *Attorney, Agent, or Firm* — J-TEK LAW PLLC; Scott T. Wakeman; Mark A. Ussai

(57) ABSTRACT

A grounding brush assembly includes a grounding brush having a support and a plurality of conductive fibers fitted inside of the support. A brush fitting plate is connected with the support of the brush, the fitting plate including a radial portion, which is supported axially against the support, and a plurality of retention tongues for axial retention of the support. The fitting plate also includes an annular axial portion for radial centering of the support of the brush, which extends from the radial portion and is supported radially against the support of the brush. Further, the retention tongues extend from the annular axial centering portion.

9 Claims, 8 Drawing Sheets

GROUNDING BRUSH ASSEMBLY

CROSS-REFERENCE

This application claims priority to French patent application no. 2302143 filed on Mar. 8, 2023, the contents of which are incorporated entirely herein by reference.

BACKGROUND OF THE INVENTION

The present invention relates to grounding devices, and more particularly to grounding devices for controlling the shaft current generated in motors or electrical machines, such as grounding brush assemblies.

In a motor or electrical machine, at least one roller bearing is fitted between the housing of the motor or electrical machine and the rotary shaft in order to support the shaft. During operation as the shaft is rotating, a difference of electrical potential may arise between the shaft and the housing of the motor or the electrical machine, which may generate an electric current between the inner ring of the roller bearing, disposed on the shaft, and the outer ring which is connected with the housing.

An electric current passing through the components of the roller bearing may damage these components, in particular the rolling elements and the raceways provided on the inner and outer rings. These electrical discharges may also generate vibrations.

In order to eliminate these disadvantages, it is known to earth or ground the rotary shaft by using a brush or a grounding brush comprising conductive fibers. The grounding brush is generally fitted in the bore of the housing of the electric motor, such that the free ends of the fibers are in radial contact with the outer surface of the rotary shaft.

Due to the conductivity of the fibers, the brush is kept at the same electrical potential as the housing of the electric motor. The inner and outer rings of the roller bearing are also at the same electrical potential, which reduces or even eliminates the problematic electrical discharges through the roller bearing.

A grounding brush assembly is disclosed in US Patent Publication No. 2021/0021180 A1, which includes a grounding brush provided with a plurality of conductive fibers, a support inside which the conductive fibers are fitted, and an annular fitting plate comprising a plurality of tongues for radial and axial retention of the support. The tongues are formed by cutting and plastic deformations of a radial portion of the fitting plate, which is supported axially on the support.

In order to be able to form the retention tongues, it is necessary to make cuts of a substantial size in the radial portion of the fitting plate. These cuts decrease the mechanical resistance of the fitting plate to the forces exerted during fitting of the plate within the bore of the housing of the associated electric motor.

In addition, due to the folded length of the retention tongues, a concentration of stresses appear on the support of the brush during the folding of the tongues. Also, the radial centering of the support is provided solely by the retention tongues, such that angular misalignment between the support and the fitting plate may occur.

SUMMARY OF THE INVENTION

The objective of the present invention is to eliminate the disadvantages discussed above.

The present invention concerns a grounding brush assembly comprising a grounding brush provided with a plurality of conductive fibers, and a support inside which the conductive fibers are fitted. The assembly also comprises a brush fitting plate which is integral with the support of the brush, the fitting plate comprising a radial portion which is supported axially against the support of the brush, and tongues for axial retention of the support.

According to a general characteristic, the fitting plate also includes an annular axial portion for radial centering of the support of the brush, which extends from the radial portion, and is supported radially against the support of the brush. The retention tongues extend from the annular axial centering portion.

With a design of this type of the fitting plate, the radial centering of the support is assured by the annular axial portion of the fitting plate, which improves the precision of the angular alignment between the support and the fitting plate.

In addition, the retention tongues are formed from the annular axial portion. Thus, the folded length of the retention tongues is reduced, which limits the phenomena of concentration of stresses on the fitting plate. In addition, the dimension of the cuts provided in the fitting plate for the formation of the tongues is also reduced.

The tongues for retention of the fitting plate preferably extend from the annular axial centering portion axially on the side opposite the radial portion.

Preferably, the support of the brush comprises a fitting portion and two lateral flanks which extend radially inwardly from the fitting portion and enclose the conductive fibers axially.

In this case, the radial portion of the fitting plate can be supported axially against one of the lateral flanks of the support, and the axial centering portion is supported radially against the fitting portion of the support.

According to one embodiment, each tongue for retention of the fitting plate comprises an axial portion which is supported radially against the fitting portion of the support of the brush, and a portion which is folded back towards the interior and is axially in contact against the support, for example against the other lateral flank of the support.

The folded-back or radial portion of each tongue for retention of the fitting plate is located or situated axially on the side opposite the radial portion of the fitting plate, relative to the support of the brush.

The tongues for retention of the fitting plate are preferably spaced from one another in the circumferential direction, for example regularly or evenly.

Preferably, the fitting plate additionally comprises a fitting portion which is offset radially towards the exterior relative to the annular axial centering portion and to the retention tongues, and is provided with an outer surface defining the outer diameter of the fitting plate.

According to a particular design, the fitting portion of the fitting plate comprises an annular flange.

The annular flange can be supported radially against the annular axial centering portion and the tongues for retention of the fitting plate by forming a fold, and in order to obtain locally a double thickness of material. The radial size of the assembly is thereby reduced.

Alternatively, the annular flange can remain radially spaced from the annular axial centering portion and the tongues for retention of the fitting plate.

According to another design, the fitting portion of the fitting plate comprises a plurality of fitting lugs which are spaced from one another in the circumferential direction.

The fitting plate may also include at least one connection portion extending from the axial centering portion and connected to the fitting portion. The connection portion and the radial portion of the fitting plate are situated axially on both sides of the support of the brush.

The present invention also concerns an electric motor comprising a housing, a shaft, and at least one grounding brush assembly as previously defined, and fitted radially between the housing and the shaft, the conductive fibers of the brush of the assembly being in contact with the shaft.

BRIEF DESCRIPTION OF THE SEVERAL VIEWS OF THE DRAWINGS

The present invention will be better understood by studying the detailed description of an embodiment, taken by way of non-limiting example, and illustrated by the appended drawings in which.

DETAILED DESCRIPTION OF THE INVENTION

Figure 1:
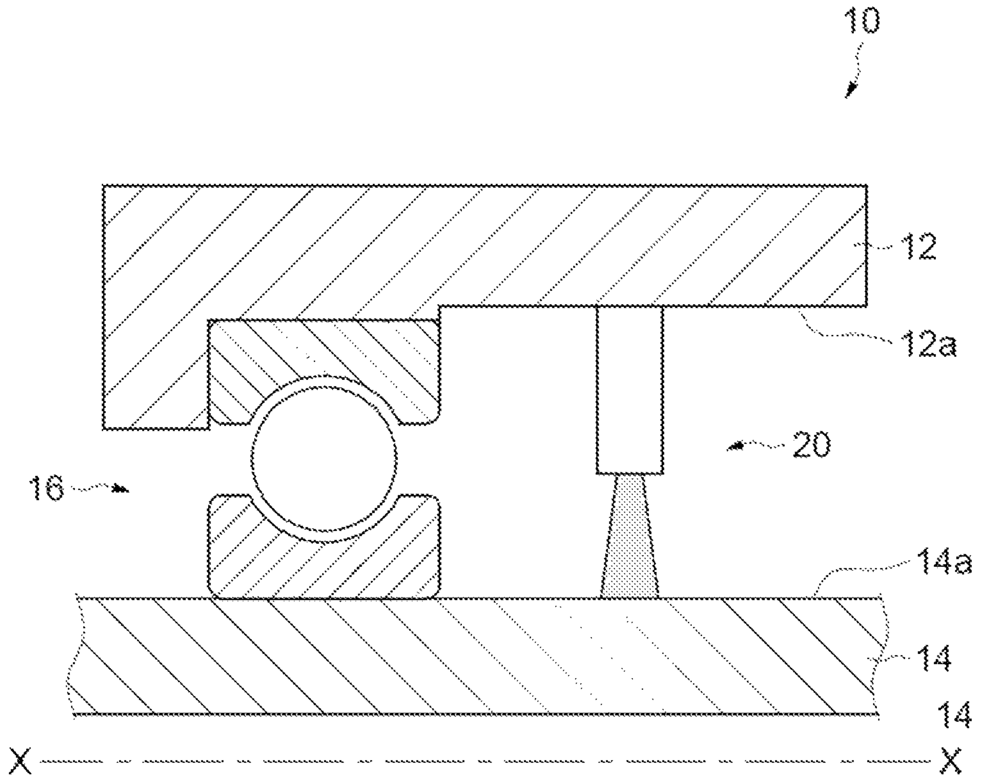
FIG. 1 is a view in axial cross-section of a grounding brush assembly fitted radially between a rotary shaft and an electric motor housing.

FIG. 1 represents in axial cross-section a part of a motor 10 or an electrical machine comprising a fixed housing 12 and a rotary shaft 14, the shaft 14 being rotatable about an axis X-X and supported radially by a roller bearing 16. In this embodiment, the bearing 16 is depicted as a ball bearing, but may alternatively include another type of rolling element, such as cylindrical rollers, tapered rollers, needles, etc. and may even be formed as a plain bearing.

The motor 10 also comprises a grounding brush assembly 20 which is fitted radially between the bore 12*a* of the housing 12 and the cylindrical outer surface 14*a* of the rotary shaft 14. The grounding brush assembly 20 provides a continual dissipation of the electrical charges which accumulate on the shaft 14 of the motor 10 during the motor operation by transferring such electrical charges to the housing 12.

With reference to FIGS. 2-5, a description will now be provided of a grounding brush assembly 20 according to a first embodiment of the invention.

The grounding brush assembly 20 has a generally annular form. The assembly 20 includes a grounding brush 30 and a brush fitting plate 40 which is configured to retain the brush 30 axially and radially.

The brush 30 includes a plurality of individual conductive fibers 31, which are designed to be placed or distributed around the circumference of the rotary shaft 14 of the motor 10. The conductive fibers 31 may be made of carbon, stainless steel, or conductive plastics, such as acrylic or nylon fibers.

The brush 30 also includes a retention unit or "support" 32 inside of which the conductive fibers 31 are fitted. In the illustrated embodiment, the support 32 is formed as an open ring. The support 32 may be fabricated by cutting and stamping. The support 32 is formed of an electrically conductive material, such as for example, aluminum, stainless steel, bronze, copper or conductive polymer or any other appropriate material. Alternatively, the support 32 may be made of non-electrically conductive material having a conductive coating or conductive paint.

Figure 6:
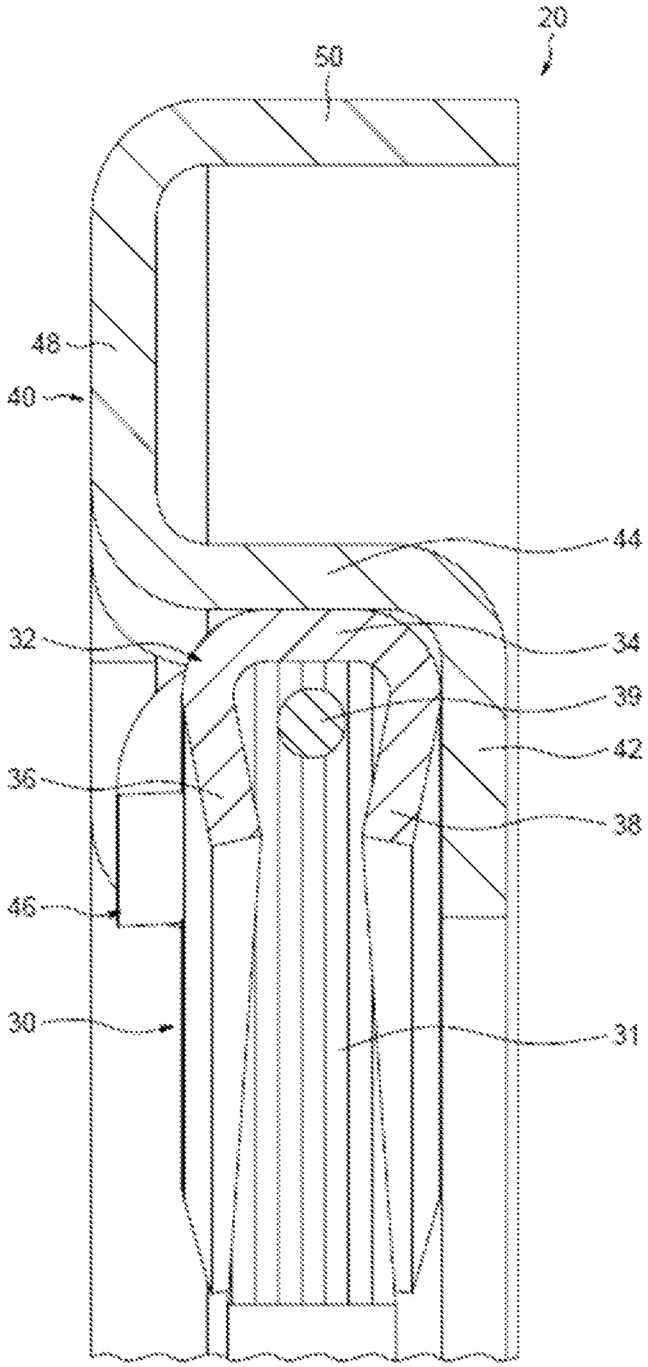
FIG. 6 is a view in cross-section along the axis VI-VI of FIG. 4.
Figure 7:
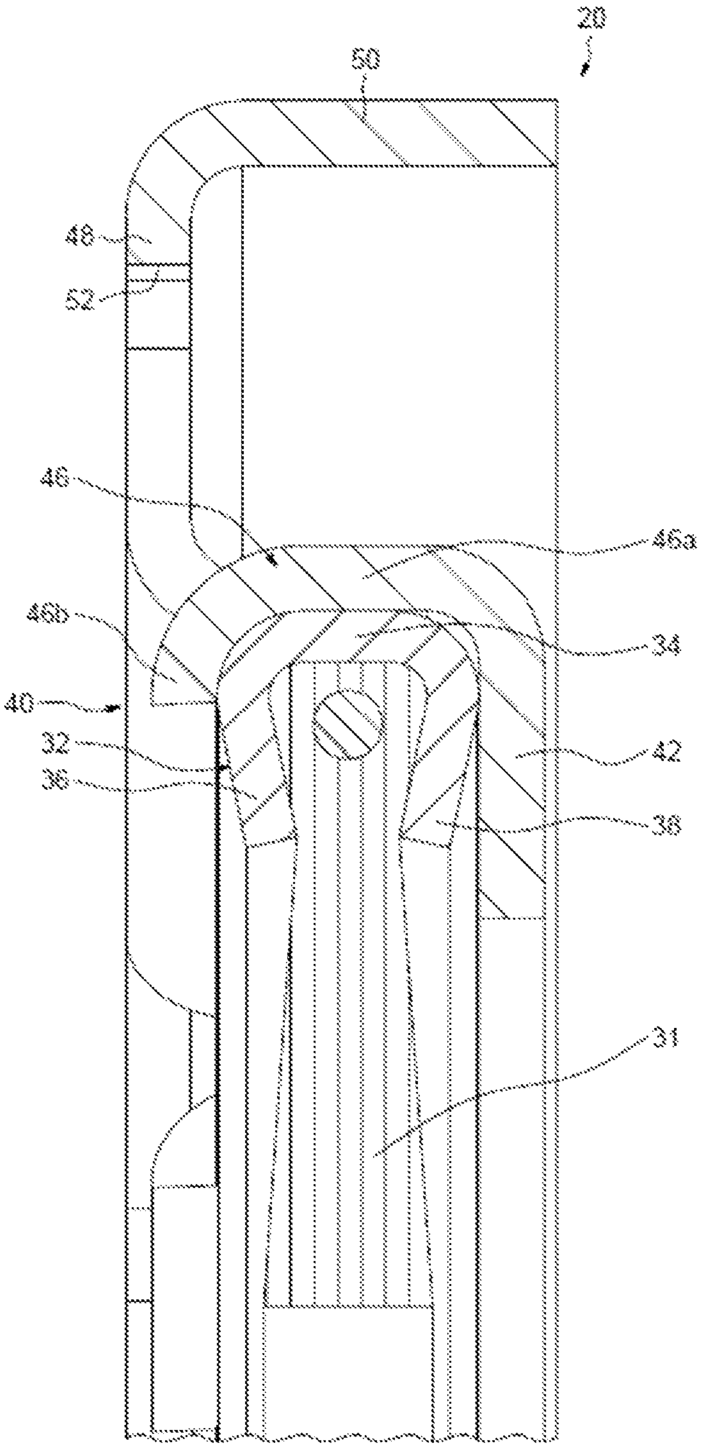
FIG. 7 is a view in cross-section along the axis VII-VII of FIG. 4.
Figure 8:
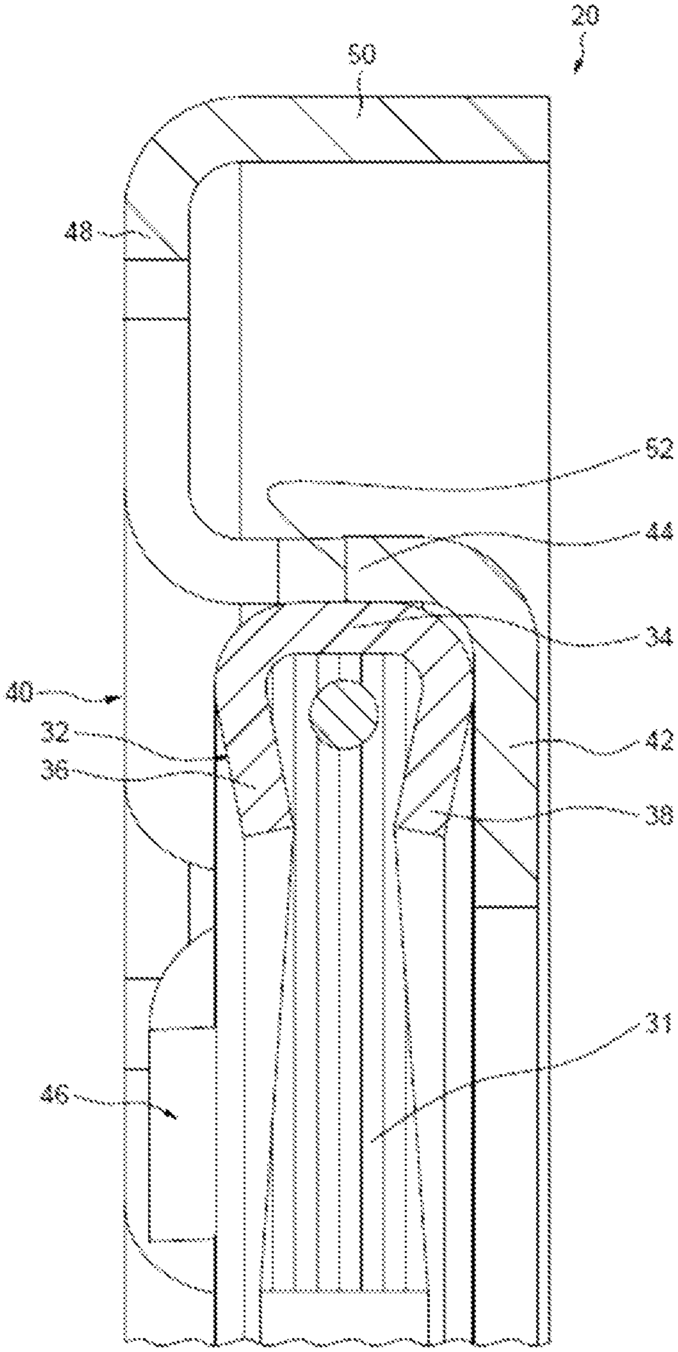
FIG. 8 is a view in cross-section along the axis VIII-VIII of FIG. 5.

As illustrated more clearly in FIGS. 6-8, the support 32 includes an axial fitting portion 34 and two opposite lateral flanks 36, 38 extending from the fitting portion 34 towards the interior, and axially enclosing the conductive fibers 31. In other words, the conductive fibers 31 are supported axially on both sides against the lateral flanks 36, 38.

The fitting portion 34 and the two lateral flanks 36, 38 delimit a channel which is open radially on the radially inner side, inside of which the conductive fibers 31 are partly situated or disposed.

In the illustrated example, the conductive fibers 31 are folded around a connection wire 39 of the support 32. The distal free end, preferably two distal ends, of each conductive fibers 31 is designed to come into radial contact with the outer surface of the rotary shaft 14 of the motor 10. The proximal end of the conductive fibers 31 is in radial contact with the fitting portion 34 of the support 32.

The lateral flank 36 extends radially inwardly from one axial end of the fitting portion 34 and the lateral flank 38 extends radially inwardly from the opposite axial end of the fitting portion 34. The two lateral flanks 36, 38 extend obliquely towards the interior from the fitting portion 34. Preferably, the lateral flanks 36, 38 are symmetrical with respect to each other relative to a median radial plane (not indicated) of the support 32. In the depicted embodiment, the fitting portion 34 extends axially. Alternatively, the fitting portion 34 may extend obliquely and/or the lateral flanks 36, 38 may be asymmetrical.

The brush 30 is preferably in the form of an open ring having a first end which is spaced circumferentially from a second end circumferentially facing the first end, as shown in FIGS. 2-5. Such circumferential spacing of the two ends of the brush 30 allows the brush 30 to adapt to different diameters of the motor shaft 14.

In general, the first end of the brush 30 and the second end are not secured to one another, but may be in contact with one another. As a variant, it is possible to secure the first end and the second end of the brush 30 to each other.

Figure 3:
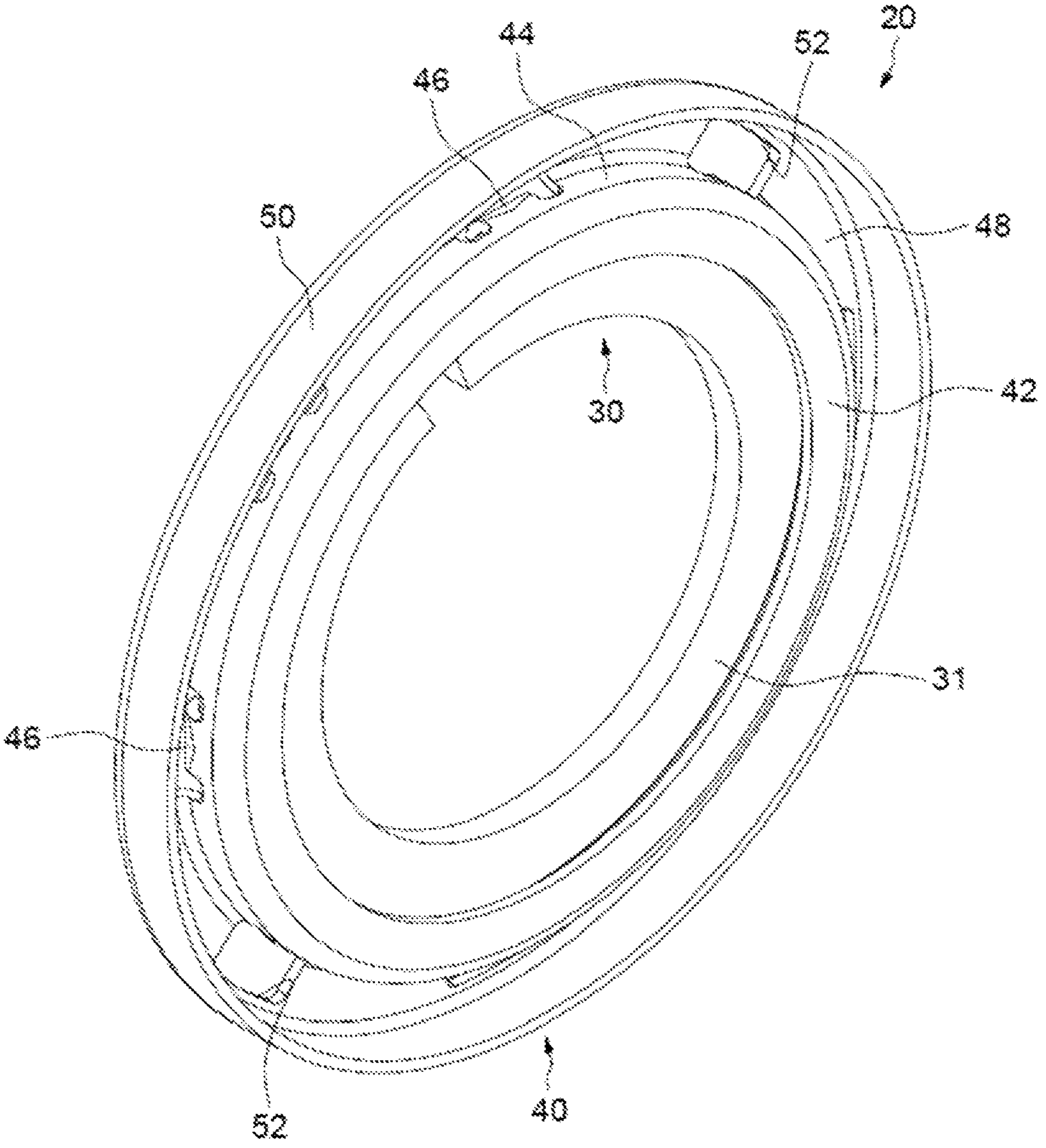
FIG. 3 is a rear perspective views of a grounding brush assembly according to an embodiment of the invention.
Figure 4:
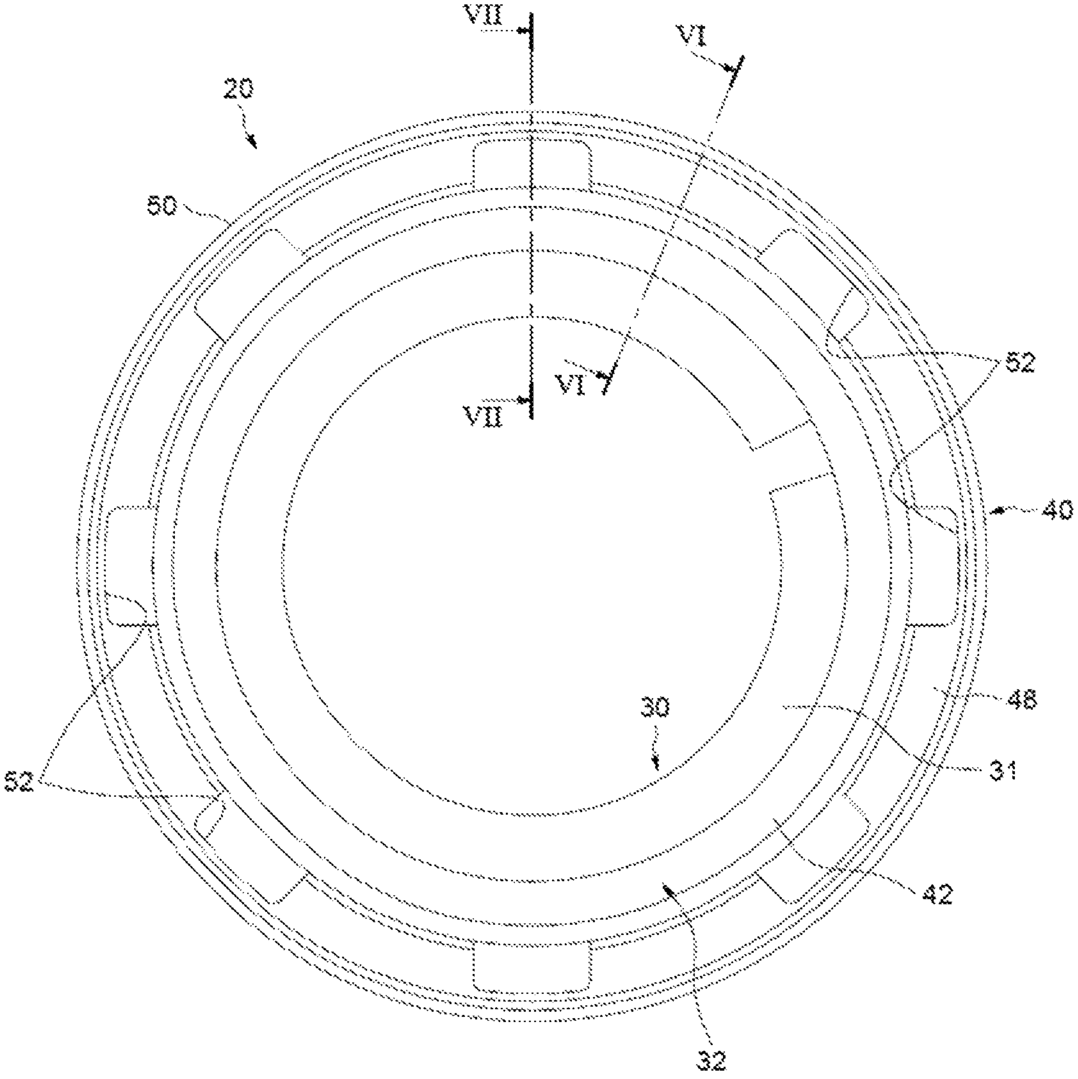
FIG. 4 is a rear plan view of the grounding brush assembly of FIGS. 2 and 3.
Figure 5:
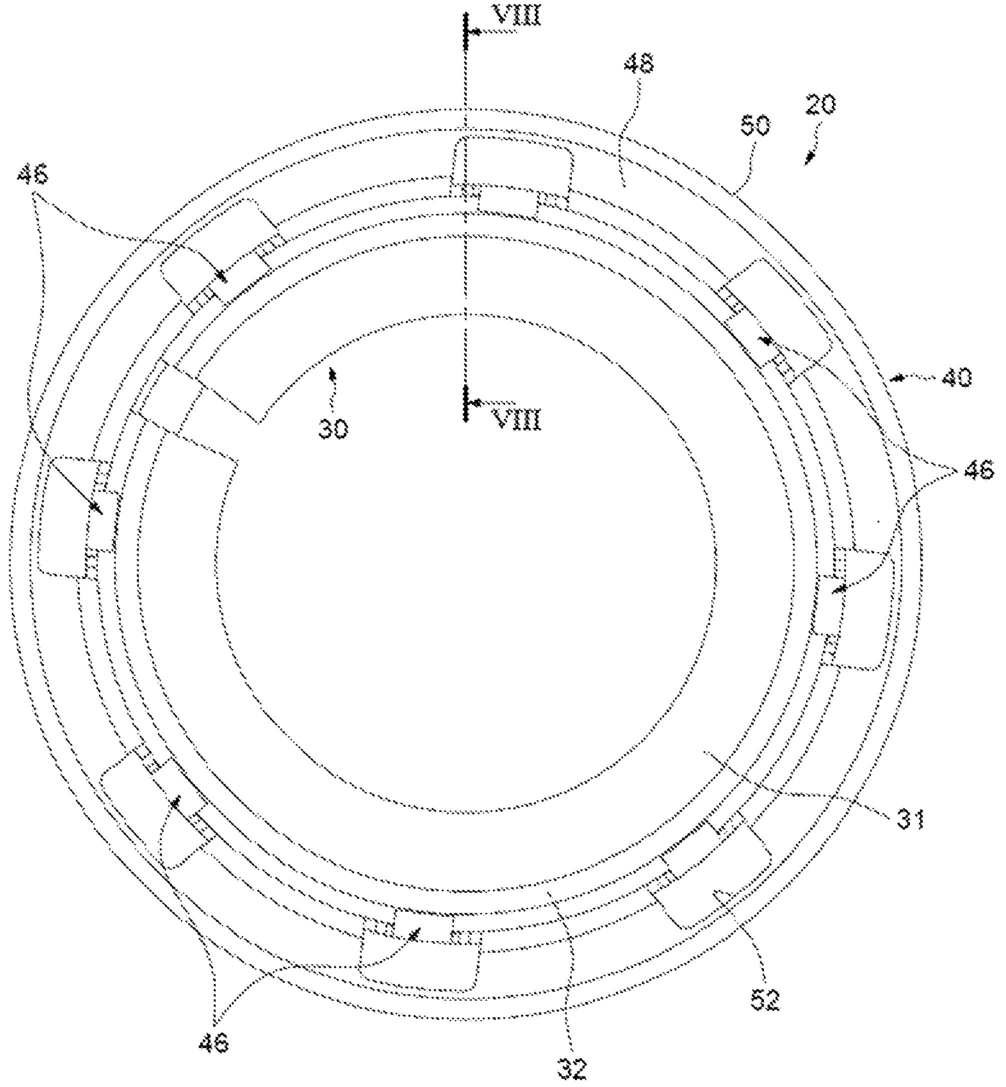
FIG. 5 is a front plan view of the grounding brush assembly of FIGS. 2 and 3.

As illustrated in particular in FIGS. 3 and 6, the fitting plate 40 of the grounding brush assembly 20 comprises an annular radial portion 42 and an annular axial portion 44 which extends from the radial portion 42. Specifically, the axial portion 44 extends from the outer surface of the radial portion 42.

The radial portion 42 of the fitting plate 40 is supported axially against the support 32 of the brush 30. More specifically, the radial portion 42 is supported axially against the lateral flank 38 of the support 32. The annular axial portion 44 surrounds the support 32 radially and is in radial contact therewith. More specifically, the annular axial portion 44 surrounds radially the fitting portion 34 of the support 32 and is in radial contact therewith. The annular axial portion 44 makes it possible to center the support 32 and radially retain the support 32.

Figure 2:
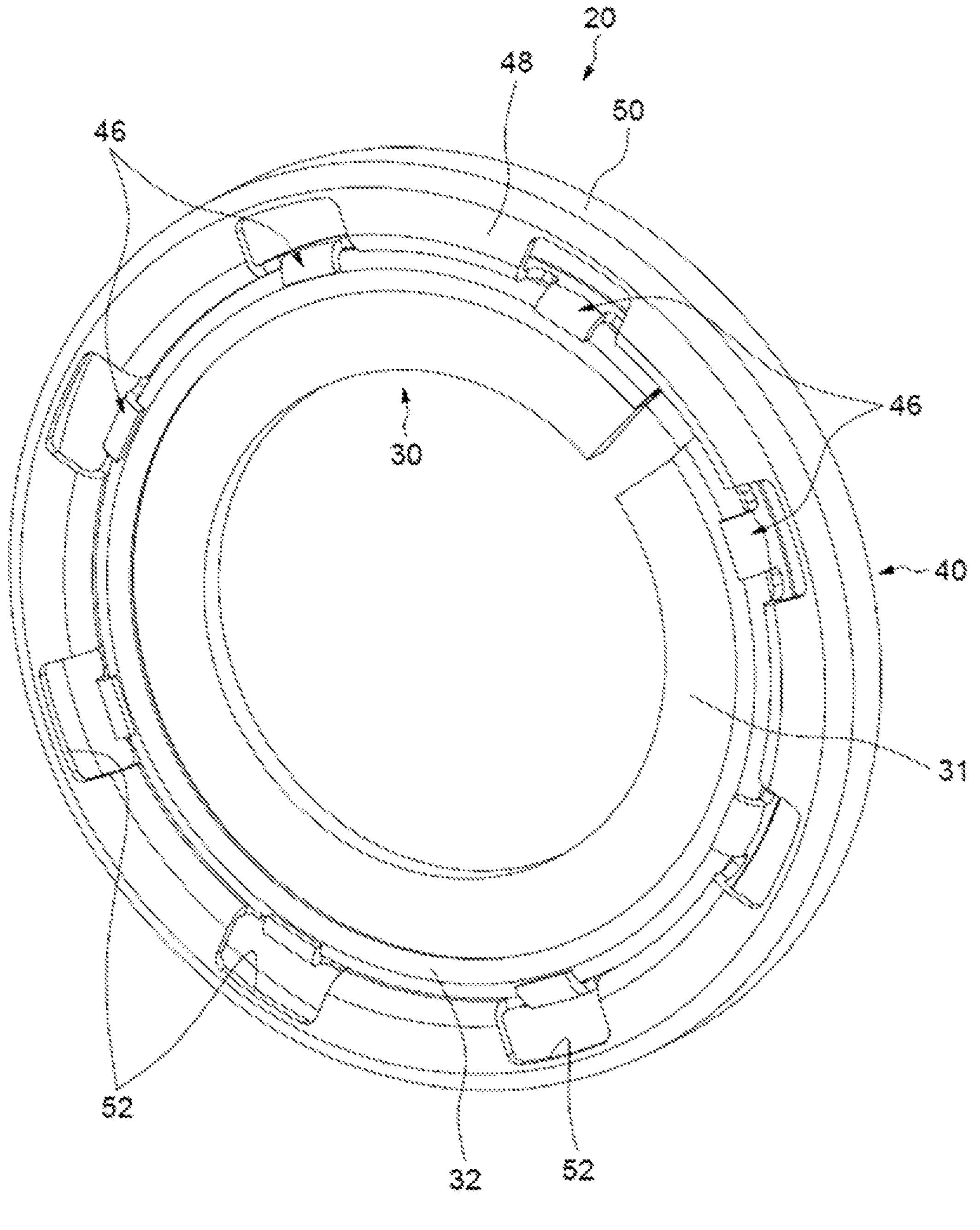
FIG. 2 is a front perspective view of a grounding brush assembly according to an embodiment of the invention.

As illustrated in particular in FIGS. 2 and 7, the fitting plate 40 of the brush assembly 20 also includes a plurality of retention tongues 46 for axial retention of the brush 30, which extend from the annular axial portion 44. The tongues 46 extend from the annular axial portion 44 axially on the side opposite to the radial portion 42.

As will be described in greater detail hereinafter, the fitting plate 40 also includes an annular radial portion 48 extending radially outwardly from the annular axial portion 44 and an annular flange 50 which extends axially from the radial portion 48. The radial portion 48 forms a portion for connection, or a "connection portion", of the annular axial portion 44 to the annular axial flange 50.

Each retention tongue 46 locally radially surrounds the support 32 and is in radial contact with the fitting portion 34 of the support 32. The support 32 is retained supported axially against the radial portion 42 by the tongues 46. The tongues 46 make it possible to axially retain the support 32.

Each retention tongue 46 includes an axial portion **46*a* extending axially from the annular axial portion 44 and a radial portion 46*b* extending radially inwardly (or folded back radially toward the interior) from the axial portion 44 and is formed at the free end of the axial portion 46*a*. Preferably, the axial portion 46*a* of each tongue 46 is in the form of a portion of a cylinder. Alternatively, the axial portion 46*a* of each tongue 46 may be formed at least generally flat. Each axial portion 46*a* locally radially surrounds the support 32 and is in contact therewith. More specifically, each axial portion 46*a* locally radially surrounds the fitting portion 34 of the support 32** and is in radial contact therewith.

The radial or "folded-back" portion **46*b* of each tongue 46 enables the axial retention of the support 32 of the grounding brush 30. The folded-back/radial portion 46*b* of each tongue 46 is in axial contact against the lateral flank 36 of the support 32. In this case, the tongues 46** are formed identical to each other.

The tongues 46 of the fitting plate 40 are circumferentially spaced apart from each other, i.e., spaced from one another in the circumferential direction, in this case regularly or evenly. Alternatively, the tongues 46 may be irregularly circumferentially spaced or staggered. In the embodiment illustrated, there are eight tongues 46. Alternatively, it is possible to provide a greater or lesser number of retention tongues 46. For example, it is possible to provide two tongues 46 or at least four tongues 46. Preferably, the fitting plate 40 includes at least two tongues 46.

As previously indicated, the fitting plate 40 includes the radial portion 48 extending radially outwardly from the annular axial portion 44. The radial portion 48 extends from an axial side of the annular axial portion 44 opposite to the axial side from which extends radial portion 42. As such, the radial portion 48 is offset axially relative to the radial portion 42. The two radial portions 42, 48 are each located on a separate axial side of the support 32. The radial portion 42 is supported axially against the lateral flank 38 of the support 32, and the radial portion 48 is offset axially relative to the lateral flank 36 of the support 32 on the side opposite to the radial portion 42.

A plurality of through openings 52 are provided extending through the thickness of the radial portion 48 and in the thickness of the annular axial portion 42 of the fitting plate 40, as shown in particular in FIGS. 2, 3 and 8.

The openings 52 are formed during a partial cutting of the fitting plate 40 to form the retention tongues 46. The tongues 46 are preferably formed by cutting, folding and crimping of the fitting plate 40. Due to the presence of the openings 52, the annular axial portion 44 of the fitting plate 40 has a locally reduced length in the area of each opening 52. Each opening 52 extends on the axial portion 44, while remaining axially spaced from the radial portion 42.

The annular flange 50 of the fitting plate 40 extends axially from a large diameter edge of the radial portion 48. In the depicted embodiment, the flange 50 extends axially from the same side as the annular axial portion 44 and the tongues 46. Alternatively, the flange 50 could extend axially on the opposite side.

The flange 50 radially surrounds the annular axial portion 44 and the tongues 46 while remaining radially spaced therefrom. In other words, the bore of the flange 50 is spaced radially outwardly from the axial portions 44 and the tongues 46 by a non-zero radial distance. The outer surface of the flange 50, radially opposite to the bore of the flange 50, defines the outer diameter of the fitting plate 40. The flange 50 forms a portion for fitting and centering of the fitting plate 40 during the fitting in the bore **12*a* of the housing 12 of the associated electric motor 10**.

Alternatively, the flange 50 may be supported radially against the annular axial portion 44 and the tongues 46 by forming a fold, which provides or forms locally a double thickness of material. In such a case, the fitting plate 40 is formed without the radial connection portion 48 connecting the annular axial portion 44 to the flange 50.

The fitting plate 40 is preferably made by cutting and stamping. The fitting plate 40 is made of a conductive material, such as for example, aluminum, stainless steel, bronze, copper, a conductive polymer or any other appropriate conductive material. Alternatively, the fitting plate 40 may be formed of an electrically non-conductive material with a conductive coating or a conductive paint.

In the embodiment, the fitting plate 40 includes an annular flange 50. Alternatively, the flange 50 could be replaced by a plurality of spaced-apart lugs which provide the function of fitting and centering of the fitting plate 40.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers fitted within the support; and a brush fitting plate connected with the support of the brush and including a radial portion supported axially against the support of the brush, a plurality of retention tongues configured to axially retain the support, an annular axial centering portion configured to radially center the support of the brush and extending from the radial portion, the axial centering portion of the fitting plate being supported radially against the support of the brush and the retention tongues extending from the axial centering portion, an annular fitting portion for fitting and centering the fitting plate within a bore of a housing, the annular fitting portion being offset radially outwardly with respect to and radially surrounding the annular axial centering portion and the retention tongues and having an outer surface defining the outer diameter of the fitting plate, and at least one radial connection portion extending radially outwardly from an axial side of the annular axial centering portion opposite to the radial portion of the fitting plate and connected to the fitting portion.

2. The assembly according to claim 1, wherein the plurality of retention tongues extend axially from a side of the annular axial centering portion opposite to the radial portion.

3. The assembly according to claim 1, wherein the support of the brush includes a fitting portion and two lateral flanks extending radially inwardly from the fitting portion and axially enclosing the conductive fibers, the radial portion of the fitting plate being supported axially against one of the lateral flanks of the support and the annular axial centering portion being supported radially against the fitting portion of the support.

4. The assembly according to claim 3, wherein each one of the plurality of retention tongues includes an axial portion supported radially against the fitting portion of the support of the brush and a radial portion extending radially inwardly from the axial portion and axially contacting the support.

5. The assembly according to claim 1, wherein the plurality of retention tongues are circumferentially spaced apart.

6. The assembly according to claim 1, wherein the fitting plate further includes a fitting portion which is offset radially outwardly with respect to the annular axial centering portion and with respect to the retention tongues, the fitting portion having an outer surface defining the outer diameter of the fitting plate.

7. The assembly according to claim 6, wherein the fitting portion of the fitting plate includes an annular flange.

8. The assembly according to claim 6, wherein the fitting portion of the fitting plate includes a plurality of fitting lugs which are spaced apart from each other in the circumferential direction.

9. An electric motor comprising:

a housing;

a shaft; and at least one grounding brush assembly according to claim 1, the grounding brush assembly being fitted radially between the housing and the shaft, the conductive fibers of the brush of the assembly being in contact with the shaft.

* * * * *